US008014418B2

(12) United States Patent
Shankara

(10) Patent No.: US 8,014,418 B2
(45) Date of Patent: Sep. 6, 2011

(54) ALLOCATING BURST DATA UNITS TO AVAILABLE TIME-SLOTS

(75) Inventor: Udaya Shankara, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 1042 days.

(21) Appl. No.: 11/845,694

(22) Filed: Aug. 27, 2007

(65) Prior Publication Data

US 2008/0075047 A1    Mar. 27, 2008

(30) Foreign Application Priority Data

Sep. 28, 2006  (IN) ................. 2124/DEL/2006

(51) Int. Cl.
*H04L 12/43* (2006.01)
(52) U.S. Cl. ........................................ 370/459
(58) Field of Classification Search .............. None
See application file for complete search history.

(56) References Cited

U.S. PATENT DOCUMENTS

| | | | | |
|---|---|---|---|---|
| 4,389,720 A * | 6/1983 | Baxter et al. | ........ | 370/263 |
| 4,797,877 A * | 1/1989 | Pope et al. | ........ | 370/261 |
| 5,241,536 A * | 8/1993 | Grimble et al. | ........ | 370/398 |
| 6,128,303 A * | 10/2000 | Bergantino et al. | ........ | 370/398 |
| 6,195,701 B1 * | 2/2001 | Kaiserswerth et al. | ........ | 709/231 |
| 6,359,891 B1 * | 3/2002 | Bergantino et al. | ........ | 370/398 |
| 6,597,690 B1 * | 7/2003 | Mehta et al. | ........ | 370/360 |
| 6,870,749 B1 * | 3/2005 | Park et al. | ........ | 365/49.1 |
| 7,711,893 B1 * | 5/2010 | Venkatachary | ........ | 711/108 |
| 2002/0085572 A1 * | 7/2002 | Mehta et al. | ........ | 370/412 |
| 2002/0161969 A1 * | 10/2002 | Nataraj et al. | ........ | 711/108 |
| 2003/0193955 A1 * | 10/2003 | Beshai | ........ | 370/395.4 |
| 2005/0068968 A1 * | 3/2005 | Ovadia et al. | ........ | 370/396 |
| 2006/0274654 A1 * | 12/2006 | Shankara | ........ | 370/230 |

\* cited by examiner

*Primary Examiner* — Ayaz R Sheikh
*Assistant Examiner* — Timothy J Weidner
(74) *Attorney, Agent, or Firm* — Blakely, Sokoloff, Taylor & Zafman LLP

(57) ABSTRACT

A network device of a network environment may support burst switched technology. The network device may comprise a burst generator, a scheduler, and a content addressable memory to allocate the bursts to earliest available time slots. The burst generator may generate bursts, which may comprise packets having a common destination address. The scheduler may generate one or more content addressable memory entries comprising bits, which represent the time slots, generate key based on the size of the burst, and allocating the bursts to the earliest available time slots. The available time slots may be determined by comparing the key with the content addressable memory entries.

19 Claims, 6 Drawing Sheets

| Weight Factor (W) | Time-slot Bitmap (G) | Reflector (R) |
|---|---|---|
| 31 | 0 1 0 0 0 1 1 1 | 1 0 0 |
| 0 | 1 0 0 0 1 1 0 0 | 0 1 1 |
| 1 | 0 1 1 1 1 1 1 1 | 0 1 1 |
| 2 | 0 1 1 0 0 0 1 1 | 1 1 0 |
| 29 | 1 1 0 0 1 1 0 0 | 0 1 1 |
| 30 | 0 1 1 1 1 0 0 0 | 0 1 0 |

500 — 501, 502, 503, 504, 530, 532

| Weight Factor (W) | Time-slot Bitmap (G) | Reflector (R) |
|---|---|---|
| 30 | 0 1 0 0 0 1 1 1 | 1 1 1 |
| 31 | 1 1 1 1 1 1 1 1 | 0 0 0 |
| 0 | 0 0 0 0 1 1 1 1 | 0 1 1 |
| 1 | 0 1 1 0 0 0 1 1 | 1 1 0 |
| 28 | 1 1 0 0 1 1 0 0 | 0 1 1 |
| 29 | 0 1 1 1 1 0 0 0 | 0 1 0 |

ALLOCATING BURST DATA UNITS TO AVAILABLE TIME-SLOTS

BACKGROUND

This application claims priority to Indian Patent Application No. 2142/DEL/2006 filed on Sep. 28, 2006.

A computer network refers to a group of interconnected network devices, which can share information and resources. The network device may comprise an end device such as a client and a server and an intermediate device such as a router or a switch. A group of intermediate devices may, together, form a core network and an intermediate device may support one or more end devices. For example, an ingress router, of the core network, may receive data units from one or more end devices and may send the data units to an appropriate egress router.

The core network may comprise high bandwidth networks such as optical burst switched networks. The ingress router of the core network may generate bursts with each burst comprising data units having a common destination and collected in pre-determined intervals. The ingress router may allocate time slots to each burst and the data units of the bursts may be sent onward during the allocated time slots. A software based approach to allocate time slots to the bursts may consume more time.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 5 illustrates a content addressable memory storing the CAM entries generated during a present time horizon and a next time horizon.

DETAILED DESCRIPTION

The following description describes allocating burst data units to available time-slots. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Figure 1:
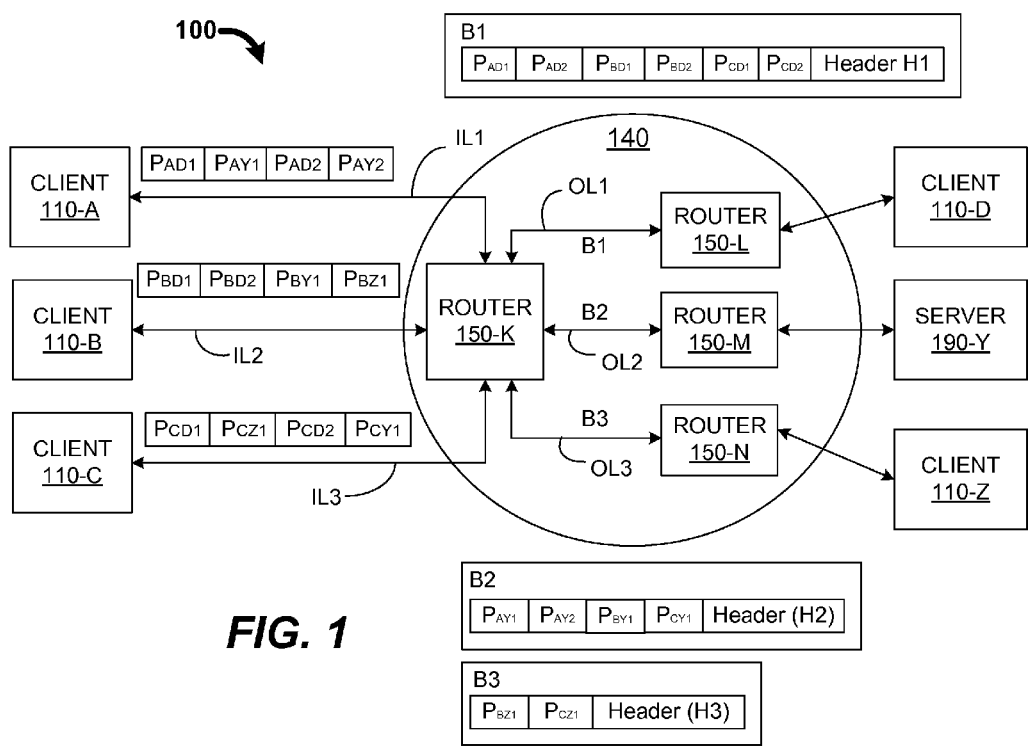
FIG. 1 illustrates an embodiment of a network environment 100.

An embodiment of a network environment 100 is illustrated in FIG. 1. The network environment 100 may comprise end devices such as clients 110-A, 110-B, 110-C, 110-D, and 110-Z and a server 190-Y and a core network 140 comprising intermediate devices such as routers 150-K, 150-L, 150-M, and 150-N.

The clients 110 may send data units such as packets to other clients 110 or the server 190 and may receive packets from other network devices. In one embodiment, the client devices 110-A, 110-B, and 110-C may be coupled to the ingress router 150-K. The client 110-D, server 190-Y, and the client 110-Z may be coupled to egress router 150-L, 150-M, and 150-N, respectively. For example, the client 110-A, 110-B, and 110-C may send packets ($P_{AD1}$, $P_{AD2}$, $P_{AY1}$, $P_{AY2}$), ($P_{BD1}$, $P_{BD2}$, $P_{BY1}$, $P_{BZ1}$), and ($P_{CD1}$, $P_{CD2}$, $P_{CY1}$, $P_{CZ1}$) to the ingress router 150-K. In one embodiment, the client 110 may comprise a desktop computer, a laptop computer, a mobile phone, or a personal digital assistant and such other devices.

The core network 140 may comprise routers 150-K, 150-L, 150-M, and 150-N, which may be coupled together using communication medium such as an optical fiber, or a co-axial cable, or a satellite link. The routers 150-K to 150-N may be coupled to one or more end devices such as the clients 110 and the server 190. In one embodiment, the ingress router 150-K may be coupled to the clients 110-A, 110-B, and 110-C and the egress routers 150-L, 150-M, and 150-N may be coupled to the client 110-D, the server 190-Y, and the client 110-Z, respectively.

The ingress router 150-K may receive the packets on input links IL1, IL2, and IL3 from the clients 110-A, 110-B, and 110-C, respectively, and may generate burst data units such as B1, B2, and B3. The ingress router 150-K may forward the burst data unit B1, B2, and B3 on out-links OL1, OL2, and OL3, respectively. In one embodiment, the routers 150 may support optical burst switching technology. In one embodiment, the ingress router 150-K may, quickly, allocate the burst data units B1-B3 to earliest available time slots. In one embodiment, the ingress router 150-K may use hardware components such as a scheduler, a content addressable memory (CAM) and such other components to, quickly, allocate the burst data units B1-B3 to the earliest available time slots.

Figure 2:
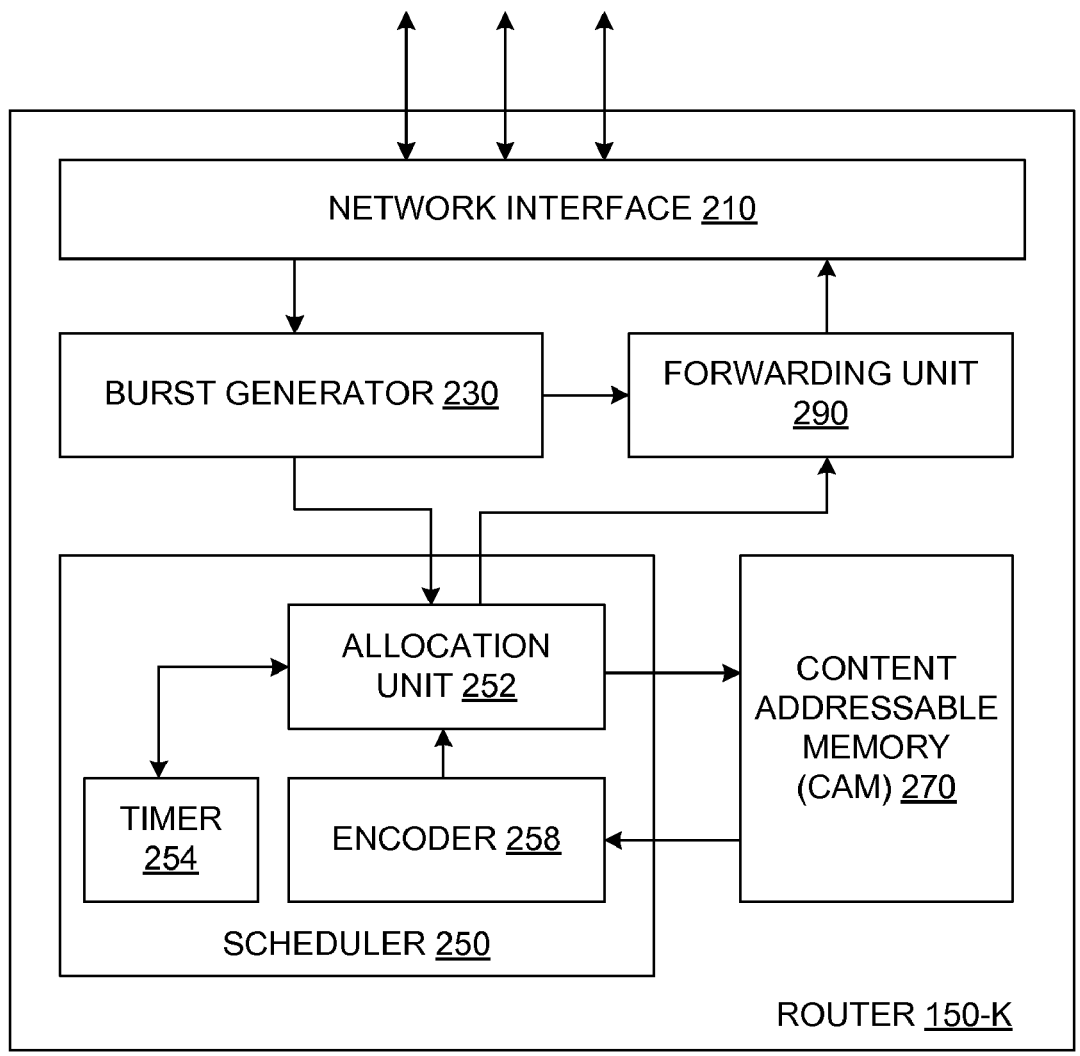
FIG. 2 illustrates an embodiment of a router of FIG. 1.

An embodiment of the router 150-K is illustrated in FIG. 2. The router 150-K may comprise a network interface 210, a burst generator 230, a scheduler 250, a content addressable memory 270, and a forwarding unit 290.

The network interface 210 may receive packets from the client 110-A, 110-B, and 110-C and may send the packets to the burst unit 230. The network interface 210 may, also, receive burst data units B1, B2, and B3 from the forwarding unit 290 and may pass the burst data units to a network device such as a router 150-L coupled to the router 150-K. The network interface 210 may support physical, electrical, and protocol interfaces to support the network devices coupled to the router 150-K.

The burst generator 230 may receive packets from the network interface 210 and may generate one or more burst data units. In one embodiment, the burst generator 230 may generate a burst data unit by collecting all the packets, which may be received within a pre-specified interval and comprise a common destination address. In one embodiment, the burst generator 230 may add a header (Hx) to each burst data unit (Bx).

For example, the burst generator 230 may receive packets ($P_{AD1}$, $P_{AY1}$, $P_{AD2}$, $P_{AY2}$, $P_{BD1}$, $P_{BD2}$, $P_{BY1}$, $P_{BZ1}$, $P_{CD1}$, $P_{CZ1}$, $P_{CD2}$, and $P_{CY1}$) from the network interface 210. The burst generator 230 may generate a first burst data unit B1 comprising packets $P_{AD1}$, $P_{AD2}$, $P_{BD1}$, $P_{BD2}$, $P_{CD1}$, $P_{CD2}$, and a header H1, a second burst data unit B2 comprising packets $P_{AY1}$, $P_{AY2}$, $P_{BY1}$, $P_{CY1}$, and a header H2, and a third burst data unit B3 comprising packets $P_{BZ1}$, $P_{CZ1}$, and a header H3.

In one embodiment, the burst generator 230 may generate the first burst data unit B1 from the packets having a destination address 'D' and received in a time interval Ts. However, the packets having a destination address 'D' and arriving during time interval Ts+1 may be used generate another burst data unit $B_M$. The burst generator 230 may pass each burst data unit to the scheduler 250 and the forwarding unit 290.

In one embodiment, the scheduler 250 may allocate the burst data units to the earliest available time slots. The scheduler 250 may be coupled with the content addressable memory 270 to determine the earliest time slots available to which a burst may be allocated. In one embodiment, the scheduler 250 may comprise an allocation unit 252, a timer 254, and an encoder 258. In one embodiment, the allocation unit 252 may determine a present time horizon having duration $T_{HORIZON-PRESENT}$, which may equal time duration between a present time point ($T_P$) and a maximum time point ($T_{MAX}$) in which the burst data units may be allocated.

In one embodiment, the maximum time point $T_{MAX}$ may refer to a time point in future and the $T_{HORIZON-PRESENT}$ may equal ($T_{MAX}-T_P$). In one embodiment, the allocation unit 252 may divide the $T_{HORIZON-PRESENT}$ into smaller units referred to as time slots and the duration of each time slot may equal $T_{SLOT}$. For example, the present time horizon may comprise N time slots and the $T_{HORIZON-PRESENT}=(T_{MAX}-T_P)=N \times T_{SLOT}$.

In one embodiment, the allocation unit 252 may represent each allocated or unavailable time slot by a first bit or logic level 0 and an unallocated or available time slot by a second bit or logic level 1. The allocation unit 252 may represent the time slots in the present time horizon by one or more CAM entries. However, representing each time slot by a CAM entry may increase the size of the content addressable memory 270 and representing all the time slots by a single CAM entry may increase the comparison time.

As a result, the allocation unit 252 may generate each CAM entry to represent a group of time slots and each group of time slots may be referred to as an aggregation unit. In one embodiment, the size of each CAM entry may equal (G+K) bits. In one embodiment, the number of time slots in each aggregation unit may equal G time slots. In one embodiment, the allocation unit 252 may identify a time horizon comprising N (=256) time slots and the allocation unit 252 may generate M (=32) aggregation units from N time slots of the time horizon. In one embodiment, each CAM entry representing the aggregation unit may comprise N/M (256/32=8) bits.

In one embodiment, the K units may be referred to as reflector bits, which may be generated by the CAM 270 as described below. The time duration of each aggregation unit may equal $T_{AGG}$. For example, the duration of the present time horizon $T_{HORIZON-PRESENT}$ may equal $T_{SLOT} \times 256$ (=N), which may be divided into 32 (=M) equal durations and each duration may equal $T_{AGG}(=8 \times T_{SLOT})$. As a result, the allocation unit 252 may generate 32 CAM entries with each CAM entry comprising 8 (=G) bits each representing a time slot.

Also, in one embodiment, the allocation unit 252 may generate a next time horizon by sliding the present time horizon, forward, by a duration equaling $T_{AGG}$. In one embodiment, the allocation unit 252 may generate a next time horizon after a pre-specified duration such as the duration of the aggregation unit has elapsed. In one embodiment, the duration $T_{HORIZON-NEXT}$ of the next time horizon may equal $\{(T_{MAX}+T_{AGG})-(T_P+T_{AGG})\}$. In one embodiment, the allocation unit 252 may configure the timer 254 to a count value equaling $T_{AGG}$. The allocation unit 252 may check the timer 254 to determine if the timer 254 has reached 0 and may slide the present time horizon by $T_{AGG}$ if the count value on the timer 254 elapses.

For example, the present time horizon may comprise 1-32 aggregation units and the allocation unit 252 may slide the present time horizon to generate the next time horizon to occupy 2-33 aggregation units. In one embodiment, the allocation unit 252 may re-identify $2^{nd}$ to $33^{rd}$ aggregation units as the $1^{st}$ to $32^{nd}$ aggregation units of the next time horizon. The allocation unit 252 may generate a next set of CAM entries based on the aggregation units of the next time horizon.

In one embodiment, the allocation unit 252 may receive a first burst data unit B1 from the burst generator 230 and may generate a first key based on the size of the first burst data unit B1. In one embodiment, the allocation unit 252 may generate the first key comprising (G+K) bits of which Q bits may equal a logic level 1. In one embodiment, the allocation unit 252 may set the $\{(G+K)-Q\}$ bits of the first key to a ternary logic level. In one embodiment, the size of the first burst may equal Q time slots. In one embodiment, the first Q bits of the first key may equal a logic level of 1 and the remaining $\{(G+K)-Q)\}$ bits may equal a ternary logic level.

The allocation unit 252 may send the first key to the content addressable memory 270. The allocation unit 252 may receive indicator values from the encoder 258 and the indicator values may represent the earliest available time slots during which the first burst unit B1 may be sent onward. In one embodiment, the allocation unit 252 may send a signal to the forwarding unit 290 such that the first burst unit B1 may be sent onward during the earliest available time slots.

In one embodiment, the CAM 270 may compare the first key with all the CAM entries in a single clock cycle and may generate an identifier and the weight associated with the matching entries. In one embodiment, the content addressable memory 270 may generate the reflector (R) bits field. In one embodiment, the content addressable memory 270 may generate the reflector (R) bits field of the present entry by making the R bits of the present equal as equal to first K bits of the next entry. Thus, the bits in the R field of the present entry may be viewed as a reflection of the first K bits of the next entry. In one embodiment, the first K bits of a next entry may be hardwired with the reflector bits of the present entry. In one embodiment, the reflector bits may be read-only bits.

The encoder 258 may receive the identifiers of all the matching entries and may generate indicator values based on pre-determined criteria. The forwarding unit 290 may receive a signal from the allocation unit 252 and may forward the bursts during the earliest available time slots. The forwarding unit 290 may generate routing tables comprising routing entries and may determine a next network device, in the path to the destination, based on the routing entries.

Figure 3:
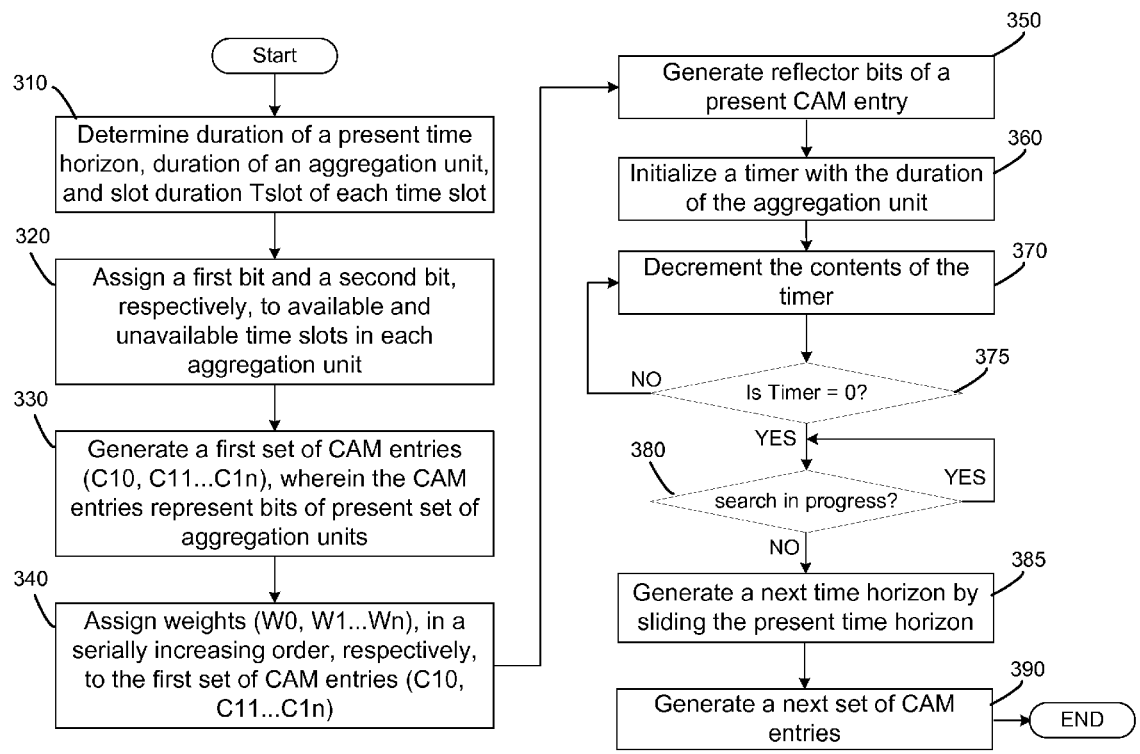
FIG. 3 illustrates an embodiment of the router generating content addressable memory entries in different time horizons.
Figure 4:
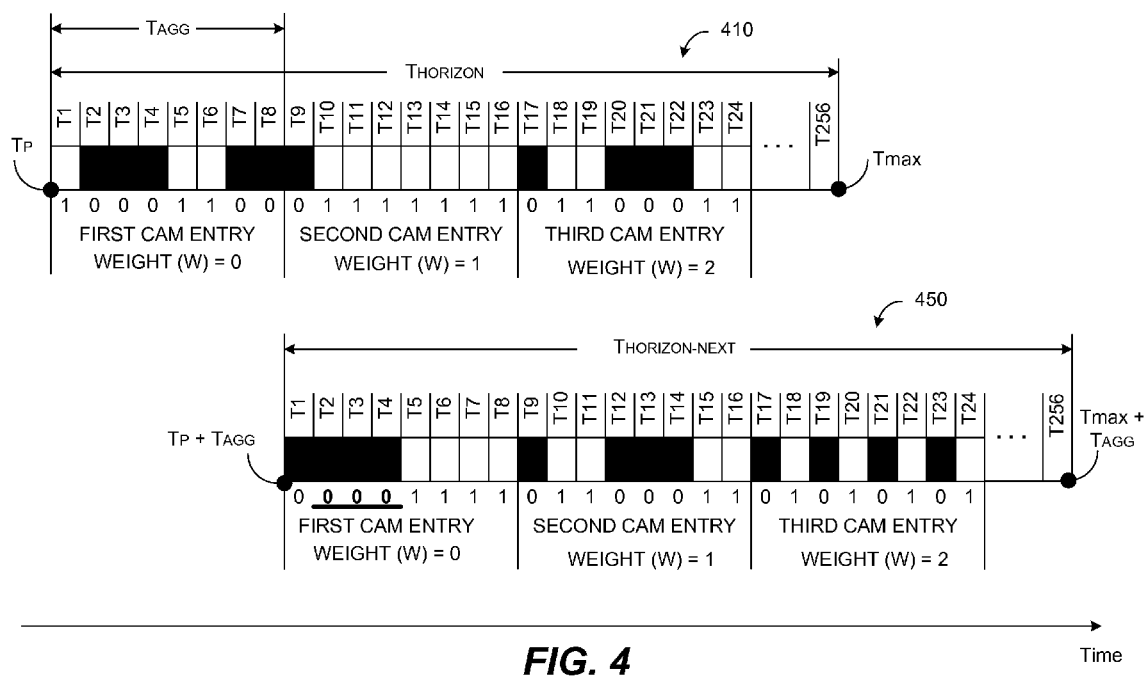
FIG. 4 illustrates generation of different sets of aggregation units, in different time horizons, from which the CAM entries may be generated.

An embodiment of the router 150-K generating CAM entries is illustrated in FIG. 3. In block 310, the allocation unit 252 may determine the duration of the time horizon, duration of the aggregation unit, and slot duration of the time slot. For example, the allocation unit 252 may determine the duration $T_{HORIZON-PRESENT}$ of the present time horizon 410 of FIG. 4, duration $T_{AGG}$ of an aggregation unit, and the duration $T_{SLOT}$ of each time slot T1 to T256 of the present time horizon 410 of FIG. 4.

In block 320, the allocation unit 252 may assign a first bit and a second bit, respectively, to the allocated and the unallocated time slots in each aggregation unit. For example, the allocation unit 252 may assign a logic level 0 to a time slot T1, as shown in a present time horizon 410 of FIG. 4, as the time slot T1 is allocated (region covered by a black shade). The allocation unit 252 may assign a logic level 0 to a time slot T2, as shown in the present time horizon 410 of FIG. 4, as the time slot T2 is unallocated (region covered by a white shade). In one embodiment, the allocation unit 252 may assign (10001100), (01111111), and (01100011) to the time slots T1-T8 forming a first aggregation unit, T9-T16 forming a second aggregation unit), and T17-T24 forming a third aggregation unit, respectively.

In block 330, the allocation unit 252 may generate a first set of CAM entries (C10, C11, ... C1n), wherein the CAM entries represent bits of a present set of aggregation units of the present time horizon 410 of FIG. 4. In one embodiment, the allocation unit 252 may generate and store CAM entries based on the present time horizon 410 and the CAM entries so generated are as shown in table 500 of FIG. 5. In one embodiment, the allocation unit 252 may store (10001100) in a time-slot bitmap field G of the first CAM entry C10, shown in row 502 of a table 500 of FIG. 5. Likewise, the allocation unit 252 may store bits of the second to thirtieth aggregation units, in the bitmap field G, of rows 503 to 530 of the table 500 of FIG. 5.

In block 340, the allocation unit 252 may assign weights (W0, W1, ... Wn), in a serially increasing order, to the CAM entries (C10, C11, ... C1n). In one embodiment, the allocation unit 252 may assign a minimum weight W0 to first CAM entry C10 as shown in weight factor (W) field of the table 500 of FIG. 5. In one embodiment, the minimum weight W0 may indicate that a highest priority may be associated with the first CAM entry C10. In one embodiment, the allocation unit 252 may assign a highest priority to the first CAM entry C10 as the bits in the first CAM entry C10 represent the earliest time slots or the first aggregation unit.

The allocation unit 252 may assign the first burst to the time slots in the first aggregation unit if the number of contiguous available time slots equals the size of the first burst. Likewise, the allocation unit 252 may assign weights (W1, W2, ... Wn) to the CAM entries (C11, C12, ... C1n), respectively as shown in weight factor (W) field of the table 500 of FIG. 5.

In block 350, the content addressable memory 270 may generate the reflector (R) bits field. In one embodiment, the content addressable memory 270 may generate the reflector (R) bits field of the present entry by making the R bits of the present equal as equal to first K bits of the next entry. In one embodiment, the first K bits of a next entry may be hardwired with the reflector bits of the present entry.

In one embodiment, the reflector bits may be read-only bits. In one embodiment, the allocation unit 252 may generate reflector bits 011, as shown in reflector bits field (R) in row 502 of table 500 of FIG. 5, for the first CAM entry C10. The reflector bits 011 of the first CAM entry C10 may equal first three bits 011 of a second CAM entry C11 (=01111111) depicted in the bitmap G of row 503 of the table 500. In one embodiment, the reflector bits (R) may be used during the search process described in FIG. 6.

In block 360, the allocation unit 252 may initialize the timer 254 with the duration of the aggregation unit. In one embodiment, the allocation unit 252 may load a count value, in the timer 254, equaling $T_{AGG}$. In one embodiment, the value of $T_{AGG}$ may represent a time duration by which the allocation unit 252 may slide the present time horizon. In block 370, the timer 254 may decrement the count starting from $T_{AGG}$.

In block 375, the timer 254 may check if the count value equals 0 and the counter 254 may set a flag when the count value reaches a zero. In one embodiment, the allocation unit 252 may cause control to pass to block 370 if the flag is reset and pass to block 380 if the flag is set.

In block 380, the allocation unit 252 may check if a search for available time slots is in progress and may cause control to pass to block 390 and back to block 380 if the search is in progress. In one embodiment, the allocation unit 252 may set a search status bit when the search begins and may reset the search status bit on completion of the search process.

In block 385, the allocation unit 252 may generate a next time horizon by sliding the present time horizon. In one embodiment, the allocation unit 252 may slide the present time horizon 410 depicted in FIG. 4 by duration $T_{AGG}$ of the first aggregation unit. Such sliding of the present time horizon 410 may result in the next time horizon 450 depicted in FIG. 4. In one embodiment, the second aggregation unit of the present time horizon may become first aggregation unit of the next time horizon, third aggregation unit of the present time horizon may become a second aggregation unit of the next time horizon and so on. The next time horizon 450 depicts the effect of sliding. Also, it may be noted that the status of the time slots T2-T4 of the first aggregation unit of the next time horizon 450 may be changed from 111 to $\overline{000}$ to reflect the allocation of the first burst B1 to the time $\overline{slots}$ T2-T4. In one embodiment, the time slots T2-T4 of the next time horizon 450 may equal the time slots T10-T12 of the present time horizon 410. In one embodiment, the size of the first burst B1 may equal the size of three time-slots.

In block 390, the allocation unit 252 may generate CAM entries based on the aggregation units of the next time horizon. In one embodiment, the allocation unit 252 may generate the CAM entries based on the aggregation units of the next time horizon 450. Only the differences in the CAM entries of table 550, as compared to the CAM entries in the table 500, are highlighted. In one embodiment, the highlighted portions correspond to differences in the CAM entries in the rows 552 and 553, weight factors in the rows 551-581, and the Rbits of the row 552. The differences between the CAM entries in the table 500 and the table 550 are described below.

In one embodiment, the allocation unit 252 may change the status of all the time slots of the first aggregation unit of the present time horizon 410 to available as the bursts allocated to the time slots of the first aggregation unit is transmitted. As a result, the bitmap G in row 552 of the table 550 may equal (11111111). As a result, the reflector bits of the CAM entry in row 551 may equal 111, which are the first three bits (=111) of the CAM entry in row 552.

The allocation unit 252 may then change the status of the allocated time slots if the allocation unit 252 allocates the time slots as a result of the search process. In one embodiment, the allocation unit 252 may determine that the first burst B1 may be assigned to the time slots T10-T12 of the second aggregation unit in the present time horizon. As a result, the allocation unit 252 may change the status of the time slots T2-T4, of the first aggregation unit of the next time horizon, from available to unavailable, which is depicted by the underlined bits in the first CAM entry (00001111) of row 554 of the table 550.

The allocation unit 252 may then merely decrement the weight factors of each CAM entry in table 500, which may in effect be equivalent to the sliding operation of block 385. As a result, the weight factors in each row 551-581 may be decremented by one. For example, the weight factor of the CAM entry in row 553 equals 0 as compared to a 1 in the row 503 of the table 500.

The allocation unit 252 may then change the reflector bits to equal the first K bits of the next CAM entry. As depicted in row 552 of table 550, the first three bits 000 of the CAM entry in the row 553 may be copied as R bits of the row 552.

Figure 6:
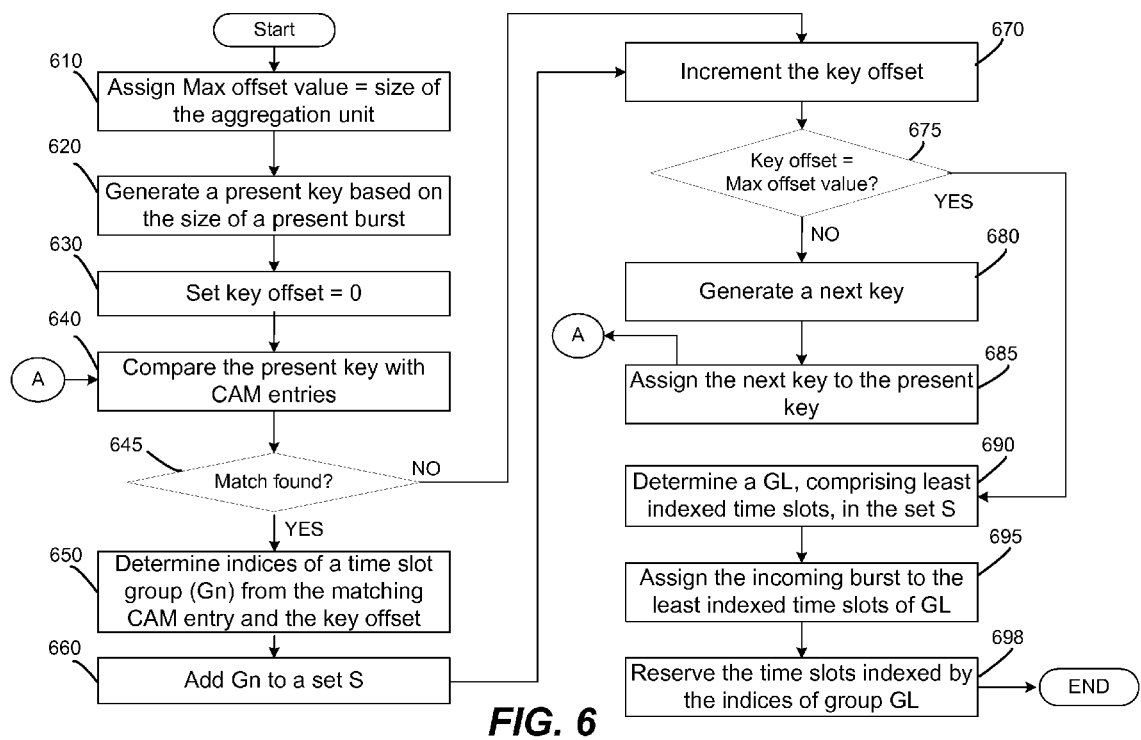
FIG. 6 illustrates an embodiment of the router determining the earliest available time-slots for sending burst units.

An embodiment of the router 150-K determining the earliest available time-slots for allocating bursts is illustrated in FIG. 6. In block 610, the allocation unit 252 may assign the size of the aggregation unit to a variable Max offset value. In one embodiment, the size of the aggregation unit may equal 8 as the aggregation unit may comprise 8 time slots.

In block 620, the allocation unit 252 may generate a present key based on the size of the present burst. In one embodiment, the present burst may equal a first burst B1 having a size equaling, for example, the size of three time slots. In one embodiment, the allocation unit 252 may generate a key of size equaling a sum of a length of the bitmap G (=8) and the length of the reflector bits (=3). In one embodiment, the size of the key may equal 11. As a result, the allocation unit 258 may generate a first key equaling (111XXXXX XXX) and 'X' may denote a ternary value.

In block 630, the allocation unit 252 may set a variable key offset to a zero. The allocation unit 252 may use the key offset to determine the offset of the first matching bit of the key starting from the most significant bit (MSB) position. In the first key, the first bit equaling a '1' is at an offset of 0 from the MSB and as a result, the key offset is set to 0 in the initial iteration.

In block 640, the content addressable memory 270 may compare the key with the CAM entries stored in the CAM 270. In one embodiment, the CAM 270 may compare the first key 111XXXXX XXX with the CAM entries of the table 500 of FIG. 5.

In block 645, the allocation unit 252 may determine if a match for the first key is found and the allocation unit 252 may cause control to pass to block 650 if a match is found and to block 670 if a match is not found. In the above example, the allocation unit 252 may cause control to pass to block 670 as no matching CAM entry is present in the CAM 270 for the first key (111XXXXX XXX).

In block 650, the allocation unit 252 may determine the indices of the time-slot group (Gn) from the matching CAM entry and the key offset value. In one embodiment, the indices of the starting time slot of the time slot group Gn may be computed as equaling {(weight of the matching CAM entry X G)+key offset+1}.

In block 660, the allocation unit 252 may add Gn to a matching data set S. In one embodiment, the set S may comprise one or more time slot groups Gn. In one embodiment, the allocation unit 252 may determine the earliest time slots by checking the indices of each time slot group. In one embodiment, the allocation unit 252 may allocate a burst to the earliest time slots available for allocation.

In block 670, the allocation unit 252 may increment the key offset. In block 675, the allocation unit 252 may check if the key offset value is less than the Max offset value. The allocation unit 252 may cause control to pass to block 680 if the key value is less than the Max offset value and to block 690 if the key offset is equal to or greater than the Max offset value.

In block 680, the allocation unit 252 may generate a next key. In one embodiment, the allocation unit 252 may generate a next key by right shifting the present key by a bit. In one embodiment, the next key may equal (X111XXXX XXX), which is right shifted version of the present key (111XXXXX XXX).

In block 685, the content addressable memory 270 may assign the next key to the present key. As a result, the present key may equal (X111XXXX XXX). The allocation unit 252 may cause control to pass block 640.

In block 690, the allocation unit 252 may determine a group GL, comprising the least indexed time slots, in the set S. For example, the set S may comprise time slot groups $G_A$=(10, 11, 12), $G_B$=(17, 18, 19), $G_C$=(45, 46, 47), and $G_D$=(221, 222, 223). The allocation unit 252 may determine that the group $G_A$=(10, 11, 12) as a group comprising the least indexed time slots.

In block 695, the allocation unit 252 may allocate the incoming burst to the time slots indexed by the indices of the group GL. In one embodiment, the allocation unit 252 may allocate the first burst B1, of size equaling three time slots, to the time slots T10, T11, and T12 indexed by the indices 10, 11, and 12, respectively, of group $G_A$.

In block 698, the allocation unit 252 may reserve the time slots indexed by the indices of the group GL. In one embodiment, the allocation unit 252 may change the status of the bits representing time slots T10-T12 from 1 to 0 to indicate that the first burst B1 is allocated to the time slots T10-T12.

During the first comparison, the present key equals (111XXXXX XXX) and as a result of the comparison at block 645, the allocation unit 252 causes control to pass to block 670. As a result of the key offset value, as in block 670, the key offset may equal 1. As key offset (=1) is less than the Max offset value (=8), as compared in block 675, the allocation unit 252 causes control to pass to block 680. The allocation unit 252, as in block 680, may generate a next key equaling (X111XXXX XXX), which is generated by right shifting the present key (111XXXXX XXX) by a bit.

During the second comparison, as in block 685, the next key (X111XXXX XXX) may be compared with the CAM entries. The allocation unit 252, as in block 645, may determine that the CAM entry (01111111), stored in row 503 of table 500, comprising a weight factor W=1 may match the next key. As a result, the allocation unit 252 may cause control to reach block 650. The allocation unit 252, as in block 650, may determine the index of the starting time slot as $10\{=(1\times 8)+1+1)\}$. The allocation unit 252 may store three values starting from the starting index. As a result, the allocation unit 252, as in block 660, may store a group $G_1=(10, 11, 12)$ in set S.

Likewise, during each comparison from the third to eighth, a next key may be generated by right shifting the present key by a bit. As a result, the keys used for the third to eighth iteration may equal (XX111XXX XXX), (XXX111XX XXX), (XXXX111X XXX), (XXXXX111 XXX), (XXXXXX111 XX), and (XXXXXXX111X), respectively. Also, the allocation unit 252 may generate a set S comprising time slot groups as $G_2(=11, 12, 13)$, $G_3(=12, 13, 14)$, $G_4(=13, 14, 15)$, $G_5(=14, 15, 16)$, $G_6(=15, 16, 17)$, and $G_7(=16, 17, 18)$. The allocation unit 252 may identify the earliest available time slots by determining the group comprising least numbered indices, which in the above example may equal G2.

During the sixth comparison, the CAM 270 may generate two matching CAM entries (01111111) with a weight W=1, depicted in row 503 of table 500, and (01000111) with a weight W=31, depicted in row 501 of table 500, for the sixth key (XXXXX111 XXX). However, the CAM entry (01111111) with a weight of 1, which is the least of 1 and 31 may be chosen as the matching CAM entry.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. An apparatus comprising
a scheduler, and
a content addressable memory coupled to the scheduler,
wherein the scheduler is to generate a plurality of content addressable memory entries comprising bits, which represent a group of available and non-available time slots, wherein size of each of the plurality of content addressable memory entries is determined based on a size (M) of an aggregation unit, which is a portion of a total number of time slots (N) in a first time horizon,
wherein the scheduler is to generate a first key in response to receiving a first burst data unit, wherein the scheduler is to determine a set of earliest available time slots based on a matching the first key with the plurality of content addressable memory entries,
wherein the scheduler is to allocate the first burst data unit to the set of earliest available time slots, and
wherein the content addressable memory is to compare the first key with the plurality of content addressable memory entries.

2. The apparatus of claim 1, the scheduler further comprises an allocation unit to generate the plurality of content addressable memory entries, wherein the size of each of the plurality of content addressable memory entries is equal to (G+K) bits, wherein G and K are positive integers, wherein G is equal to (N/M) bits.

3. The apparatus of claim 2, wherein the content addressable memory is to associate K reflector bits with each of the plurality of content addressable memory entries, wherein the reflector bits (K) of a present content addressable memory entry equals the first K bits of a next content addressable memory entry.

4. The apparatus of claim 3, wherein the allocation unit is to generate a plurality of keys comprising the first key, wherein the first key comprises (G+K) bits of which Q bits equal a first logic level, wherein the size of the first burst data unit equals Q time slots, wherein Q is a positive integer.

5. The apparatus of claim 4, wherein the allocation unit is to generate the plurality of keys, starting from the first key, by right shifting the Q bits by a key offset value.

6. The apparatus of claim 2, the allocation unit is to associate a minimum weight and a maximum weight, respectively, to a first and a last content addressable memory entry representing a first and a last aggregation unit of the time horizon, wherein weights are associated with the plurality of content addressable memory entries in a serially increasing order starting from the first content addressable memory entry.

7. The apparatus of claim 1, the scheduler further comprises an encoder, wherein the encoder is to generate an indicator value comprising a weight of an entry matching with one of the plurality of content addressable memory entries that is associated with a minimum weight, if two or more entries of the plurality of content addressable memory entries match with one of a plurality of keys.

8. The apparatus of claim 7, the allocation unit is to determine the set of available time slots comprising Q slots starting from a time slot based on the weight of a matching entry, time slots in each aggregation unit, and an offset value.

9. A method comprising
generating a plurality of content addressable memory entries comprising bits, which represent a group of available and non-available time slots, wherein size of each of the plurality of content addressable memory entries is determined based on a size (M) of an aggregation unit, which is a portion of a total number of time slots (N) in a first time horizon,
generating a first key in response to receiving a first burst data unit,
determining a set of earliest available time slots based on matching the first key with the plurality of content addressable memory entries, and
allocating the first burst data unit to the set of earliest available time slots.

10. The method of claim 9 further comprises generating the plurality of content addressable memory entries, wherein the size of each of the plurality of content addressable memory entries is equal to (G+K) bits, wherein G and K are positive integers, wherein G is equal to (N/M) bits.

11. The method of claim 10 comprises associating K reflector bits with each of the plurality of content addressable memory entries, wherein the reflector bits (K) of a present content addressable memory entry equals first K bits of a next content addressable memory entry.

12. The method of claim 11 comprises generating a plurality of keys comprising the first key, wherein the first key comprises (G+K) bits of which Q bits equal a first logic level, wherein the size of the first burst data unit equals Q time slots, wherein Q is a positive integer.

13. The method of claim 12 comprises generating the plurality of keys, starting from the first key, by right shifting the Q bits by an offset value.

14. The method of claim 10 comprises associating a minimum weight and a maximum weight, respectively, to a first and a last content addressable memory entry representing a first and a last aggregation unit of the time horizon, wherein weights are associated with the plurality of content addressable memory entries in a serially increasing order starting from the first content addressable memory entry.

15. The method of claim 9 further comprises generating an indicator value comprising a weight of an entry matching with one of the plurality of content addressable memory entries that is associated with a minimum weight, if two or more entries of the plurality of content addressable memory entries match with one of a plurality of keys.

16. The method of claim 15 comprises determining the set of available time slots comprising Q slots starting from a time slot based on the weight of a matching entry, time slots in each aggregation unit, and an offset value.

17. A system comprising
a plurality of first devices to generate packets,
a second device coupled to the plurality of first devices, wherein the second device is, to generate a first burst data unit from the packets, to generate a plurality of content addressable memory entries comprising bits, which represent a group of available and non-available time slots, wherein size of each of the plurality of content addressable memory entries is determined based on a size (M) of an aggregation unit, which is a portion of a total number of time slots (N) in a first time horizon, to generate a first key in response to receiving the first burst data unit, to determine a set of earliest available time slots based on a matching the first key with the plurality of content addressable memory entries, to allocate the first burst data unit to at least one of the set of earliest available time slots, and
a first link coupled between the second device and a third device, wherein the first link is to carry the first burst data unit based on the set of earliest available time slots allocated.

18. The system of claim 17, wherein the second device is to support optical burst switching technology.

19. The system of claim 18, wherein the second device is a network routing device.

* * * * *